(12) United States Patent
Liu et al.

(10) Patent No.: US 10,868,631 B2
(45) Date of Patent: Dec. 15, 2020

(54) CONSTRUCTION METHOD OF MODE-DIVISION MULTIPLEXING FIBER-OPTIC COMMUNICATION SYSTEM AND A CONSTRUCTED FIBER-OPTIC COMMUNICATION SYSTEM

(71) Applicant: SUN YAT-SEN UNIVERSITY, Guangdong (CN)

(72) Inventors: Jie Liu, Guangdong (CN); Guoxuan Zhu, Guangdong (CN); Xiong Wu, Guangdong (CN); Yujie Chen, Guangdong (CN); Jiangbo Zhu, Guangdong (CN); Siyuan Yu, Guangdong (CN)

(73) Assignee: SUN YAT-SEN UNIVERSITY, Guangdong (CN)

( * ) Notice: Subject to any disclaimer, the term of this patent is extended or adjusted under 35 U.S.C. 154(b) by 13 days.

(21) Appl. No.: 15/768,015

(22) PCT Filed: May 18, 2017

(86) PCT No.: PCT/CN2017/084815
§ 371 (c)(1),
(2) Date: Apr. 13, 2018

(87) PCT Pub. No.: WO2018/196056
PCT Pub. Date: Nov. 1, 2018

(65) Prior Publication Data
US 2019/0253176 A1    Aug. 15, 2019

(30) Foreign Application Priority Data

Apr. 28, 2017 (CN) .......................... 2017 1 0293411

(51) Int. Cl.
*H04J 14/04* (2006.01)
*H04B 10/61* (2013.01)
(Continued)

(52) U.S. Cl.
CPC .......... *H04J 14/04* (2013.01); *H04B 10/2581* (2013.01); *H04B 10/532* (2013.01);
(Continued)

(58) Field of Classification Search
None
See application file for complete search history.

(56) References Cited

U.S. PATENT DOCUMENTS 6,212,239 B1 * 4/2001 Hayes .................. H04L 27/001
375/227
8,958,469 B1 * 2/2015 Harris ............... H04L 25/03878
375/230
(Continued)

FOREIGN PATENT DOCUMENTS

CN    105683790    6/2016

OTHER PUBLICATIONS

Koebele et al: "40km Transmission of Five Mode Division Multiplexed Data Streams at 100Gb/s with low MIMO-DSP Complexity", ECOC, Sep. 18-22, 2011, paper Th.13.C.3, pp. 1-3.*
(Continued)

*Primary Examiner* — Li Liu
(74) *Attorney, Agent, or Firm* — JCIPRNET

(57) ABSTRACT

The present invention relates to a construction method of a mode-division multiplexing fiber-optic communication system, which includes following contents: converting multiple-input optical signals into optical propagation modes supported by a graded-index ring-core optical fiber at a transmitting end, after being multiplexed by a mode multiplexer, injecting the optical signals into the graded-index ring-core optical fiber for transmission; using a mode de-multiplexer to separate optical signals of different mode groups at a receiving end firstly; and for the separation of internal modes of the same mode group, adopting a multi-
(Continued)

channel reception and a digital signal processing method based on a multiple-input multiple-output equalization for processing: for the separation of modes in a base mode group and a high-order mode group, using a digital signal processing algorithm including a 2×2 multiple-input multiple-output equalization and a digital signal processing algorithm including a 4×4 multiple-input multiple-output equalization for recovery processing, respectively. The method according to the present invention only needs to add an optical receiver and a digital signal processing module based on the 4×4 multiple-input multiple-output equalization repeatedly while adding the mode group to expand communication capacity. Compared with the prior art, the present invention has the characteristics of low complexity, high scalability and easy upgrading.

8 Claims, 3 Drawing Sheets

(51) Int. Cl.
*H04L 25/03* (2006.01)
*H04B 10/532* (2013.01)
*H04J 14/06* (2006.01)
*H04B 10/2581* (2013.01)

(52) U.S. Cl.
CPC ........ *H04B 10/614* (2013.01); *H04B 10/616* (2013.01); *H04B 10/6161* (2013.01); *H04B 10/6164* (2013.01); *H04B 10/6165* (2013.01); *H04J 14/06* (2013.01); *H04L 25/03057* (2013.01); *H04L 2025/03426* (2013.01)

(56) References Cited

U.S. PATENT DOCUMENTS

| | | | | |
|---|---|---|---|---|
| 9,838,128 | B1* | 12/2017 | Rusch | H04B 10/0795 |
| 10,001,601 | B2* | 6/2018 | Wohlfeil | G02B 6/29323 |
| 2011/0150503 | A1* | 6/2011 | Winzer | H04B 10/60 |
| | | | | 398/202 |
| 2013/0209093 | A1* | 8/2013 | Tanimura | H04B 10/0775 |
| | | | | 398/32 |
| 2014/0126588 | A1* | 5/2014 | Koebele | H04B 10/2581 |
| | | | | 370/542 |
| 2015/0098697 | A1* | 4/2015 | Marom | H04J 14/04 |
| | | | | 398/44 |
| 2015/0104139 | A1* | 4/2015 | Brunet | H04B 10/2581 |
| | | | | 385/124 |
| 2016/0043794 | A1* | 2/2016 | Ashrafi | H04B 7/0697 |
| | | | | 370/329 |
| 2016/0112143 | A1* | 4/2016 | Yu | H04B 10/6164 |
| | | | | 398/65 |
| 2016/0204871 | A1* | 7/2016 | Li | H04L 27/2601 |
| | | | | 398/183 |
| 2016/0241341 | A1* | 8/2016 | Endo | H04B 10/50 |
| 2016/0269110 | A1* | 9/2016 | Dahan | H04B 10/0793 |
| 2017/0026095 | A1 | 1/2017 | Ashrafi et al. | |
| 2017/0163451 | A1* | 6/2017 | Willner | H04B 7/0413 |
| 2018/0302154 | A1* | 10/2018 | Ferreira | H04J 14/04 |
| 2018/0372948 | A1* | 12/2018 | Hayashi | G02B 6/02 |

OTHER PUBLICATIONS

Feng et al: "All-optical Mode-Group Division Multiplexing Over a Graded-Index Ring-Core Fiber with Single Radial Mode", OFC 2016, Mar. 2016, paper W3D.5, pp. 1-3.*
Bozinovic et al: "Terabit-Scale Orbital Angular Momentum Mode Division Multiplexing in Fibers", Science vol. 340, Jun. 28, 2013, pp. 1545-1548 and Supplementary Material, Jun. 28, 2013.*
Koebele: "Mode-division-multiplexing as a possibility to cope with the increasing capacity demand in optical transmission systems", PhD Thesis, Dec. 7, 2012.*
Soma et al: "Partial MIMO-based 10-Mode-Multiplexed Transmission over 81km Weakly-coupled Few-mode Fiber", OFC 2017, Mar. 2017, paper M2D.4, pp. 1-3.*
Jiang et al: "Linearly polarized orbital angular momentum mode purity measurement in optical fibers", Applied Optics, vol. 56, No. 7, Mar. 1 2017, pp. 1990-1995 (Year: 2017).*
Roland Ryf et al., "MIMO-Based Mode-Division Multiplexed Transmission over Multimode Fibers", The 12th International Conference on Optical Internet Proceedings, Aug. 2014, pp. 1-2.
Feng Feng et al., "All-optical Mode-Group Division Multiplexing Over a Graded-Index Ring-Core Fiber with Single Radial Mode", Optical Fiber Communications Conference and Exhibition (OFC), Mar. 2016, pp. 1-3.

* cited by examiner

CONSTRUCTION METHOD OF MODE-DIVISION MULTIPLEXING FIBER-OPTIC COMMUNICATION SYSTEM AND A CONSTRUCTED FIBER-OPTIC COMMUNICATION SYSTEM

CROSS-REFERENCE TO RELATED APPLICATION

This application is a 371 application of the international PCT application serial no. PCT/CN2017/084815, filed on May 18, 2017, which claims the priority benefit of China application no. 201710293411.8, filed on Apr. 28, 2017. The entirety of each of the abovementioned patent applications is hereby incorporated by reference herein and made a part of this specification.

BACKGROUND

Technical Field

The present invention relates to the field of fiber-optic communication, and more specifically, relates to a construction method of a mode-division multiplexing fiber-optic communication system and a constructed fiber-optic communication system.

Description of Related Art

In recent years, a mode-division multiplexing technology based on a multimode optical fiber has received widespread attentions, as it can further improve the spectral efficiency. However, the complexity of a multiple-input multiple-output equalization algorithm used in such systems has become a major factor in limiting system expansion. As with an expansion of system capacity, the number of multiplexing mode groups increases, and the multiple-input multiple-output algorithm with greater complexity is needed to equalize the crosstalk among the modes of the same mode group. In recent years, a mode-division multiplexing system based on a weak coupling few-mode optical fiber is proposed to reduce the complexity of the multiple-input multiple-output algorithm in the system. Only a 2×2 or 4×4 multiple-input multiple-output algorithm is required in these solutions to equalize the crosstalk among internal linear polarization (LP) modes in the same mode group; but as with the expansion of system capacity and the increase of the number of mode groups, for higher order mode groups such as LP41 and LP32, each mode group contains more than four degenerate modes, and it is difficult to equalize the crosstalk among internal modes by using the 4×4 multiple-input multiple-output algorithm.

At the same time, a mode-division multiplexing communication system based on orbital angular momentum (OAM) has drawn many attentions because it has an infinite number of mutual orthogonal eigenmodes in principle. In recent years, the mode-division multiplexing fiber-optic communication system based on OAM has been reported one after another, and the adopted multiplexing methods are mainly divided into two types: the first type is trying to maintain orthogonality among all OAM modes, and thus a multiplexing and a de-multiplexing of all modes are physically implemented by a mode de-multiplexer. Due to such methods are affected by factors such as system defect and instability of transmission environment, the orthogonality among the OAM modes in a long-distance transmission is difficult to guarantee, and thus a transmission distance of the system is limited; and the second type is to compensate the crosstalk among the modes caused by non-orthogonality between the OAM modes by using a multi-input multi-output equalized digital signal processing at a receiving end. However, similar to the few-mode optical fiber, as the system capacity and transmission modes increase, the complexity of the multiple-input multiple-output equalization will also increase.

SUMMARY OF THE INVENTION

In order to solve a deficiency that the complexity of a multiple-input multiple-output algorithm in a communication system provided by above prior art increases with the number of mode channels, the present invention provides a construction method of a mode-division multiplexing fiber-optic communication system.

In order to achieve the above object, an adopted technical solution of the present invention is as follows:

a construction method of a mode-division multiplexing fiber-optic communication system includes following contents:

converting multiple-input optical signals into optical propagation modes supported by a graded-index ring-core optical fiber at a transmitting end, after being multiplexed by a mode multiplexer, injecting the optical signal into the graded-index ring-core optical fiber for transmission;

using a mode de-multiplexer to separate different mode groups at a receiving end, then transmitting mode optical signals in each mode group to corresponding mode converters to be converted into Gaussian mode optical signals capable of supporting a single-mode optical fiber transmission which are then detected and received by coherent optical receivers to extract corresponding complex electrical signals;

for a 2-way complex optical signal output after a base mode group or a zero-order mode groups is received by the coherent optical receiver, using a digital signal processing algorithm including a 2×2 multiple-input multiple-output equalization for recovery processing; and for a 4-way complex optical signal output after a high-order mode group or a non-zero-order mode group is received by the coherent optical receiver, using a digital signal processing algorithm including a 4×4 multiple-input multiple-output equalization for recovery processing. In the above-described solution, when the construction method of the communication system provided by the present invention expands a communication capacity, the receiving end only needs to add the digital signal processing module of the digital signal processing algorithm including the 4×4 multiple-input multiple-output equalization besides adding the corresponding mode converter and coherent optical receiver, so the complexity of the multiple-input multiple-output algorithm of the communication system will not increase with the capacity expansion.

Compared with the prior art, the beneficial effects of the present invention are as follows:

the present invention utilizes characteristics that an isolation among the graded-index ring-core optical fiber mode groups is high and the mode degenerates in the mode group, and except for the base modes (including two modes), the number of modes in other mode groups are four, and an internal mode separation of the mode groups only requires a 2×2 or a 4×4 multiple-input multiple-output equalization, which reduces the complexity of the digital signal processing algorithm. In addition, when increasing the number of transmission mode groups to expand the communication capacity, only the digital signal processing module of the digital signal processing algorithm based on the 4×4 multiple-input multiple-output equalization needs to be added, and it has relatively high scalability. The method provided by present invention avoids a problem that the complexity of the multiple-input multiple-output algorithm increases with the number of mode channels, and it has the characteristics of low complexity, high expansibility, and can be used to upgrade based on the existing commercial optical communication technologies.

DETAILED DESCRIPTION OF THE EMBODIMENTS

The accompanying drawings are only for the purpose of illustration and are not to be construed as limiting the present invention;

The present invention is further described below in combination with the accompanying drawings and embodiments.

Embodiment 1

Figure 1:
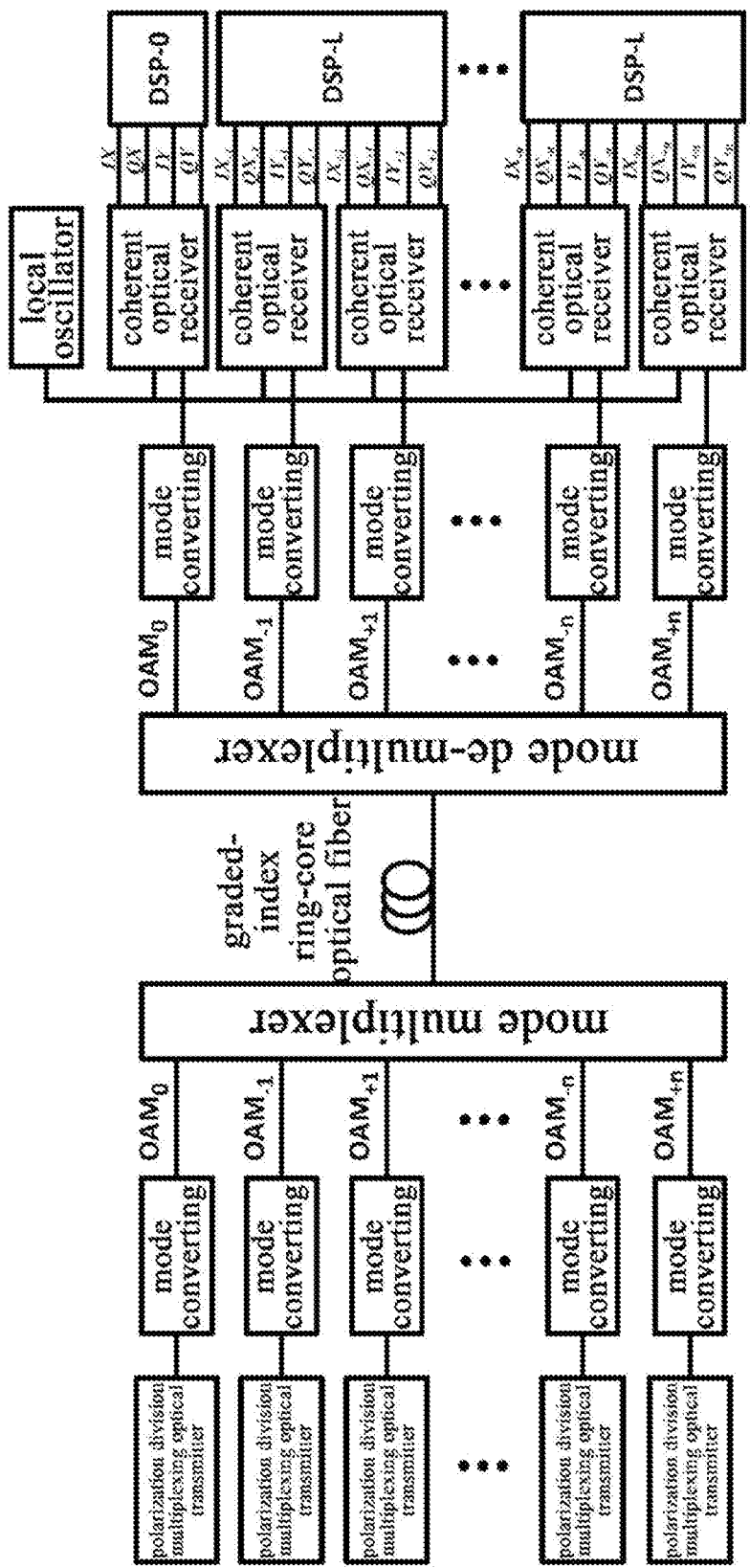
FIG. 1 is a schematic diagram of construction of a system.

An orbital angular momentum (OAM) mode-division multiplexing fiber-optic communication is taken as an example, as shown in FIG. 1. The present invention provides a construction method of a mode-division multiplexing optical fiber communication system, which includes following contents:

multiple-input optical signals are converted into optical propagation modes supported by a graded-index ring-core optical fiber at a transmitting end, after being multiplexed by a mode multiplexer, the optical signals are injected into the graded-index ring-core optical fiber for transmission;

a mode de-multiplexer is used to separate different mode groups at a receiving end, then mode optical signals in each mode group are transmitted to corresponding mode converters to be converted into Gaussian mode optical signals capable of supporting a single-mode optical fiber transmission which are then detected and received by coherent optical receivers to extract corresponding complex electrical signals;

for a 2-way complex optical signal output after a base mode group or a zero-order mode group is received by the coherent optical receiver, a digital signal processing algorithm including a 2×2 multiple-input multiple-output equalization is used for recovery processing; and for a 4-way complex optical signal output after a high-order mode group or non-zero-order mode group is received by the coherent optical receiver, a digital signal processing algorithm including a 4×4 multiple-input multiple-output equalization is used for recovery processing.

In particular, the modes included among the mode group that are injected into the graded-index ring-core optical fiber or received at the receiving end are any one of orbital angular momentum modes, linear polarization modes or graded-index ring-core optical fiber eigenmodes.

Figure 2:
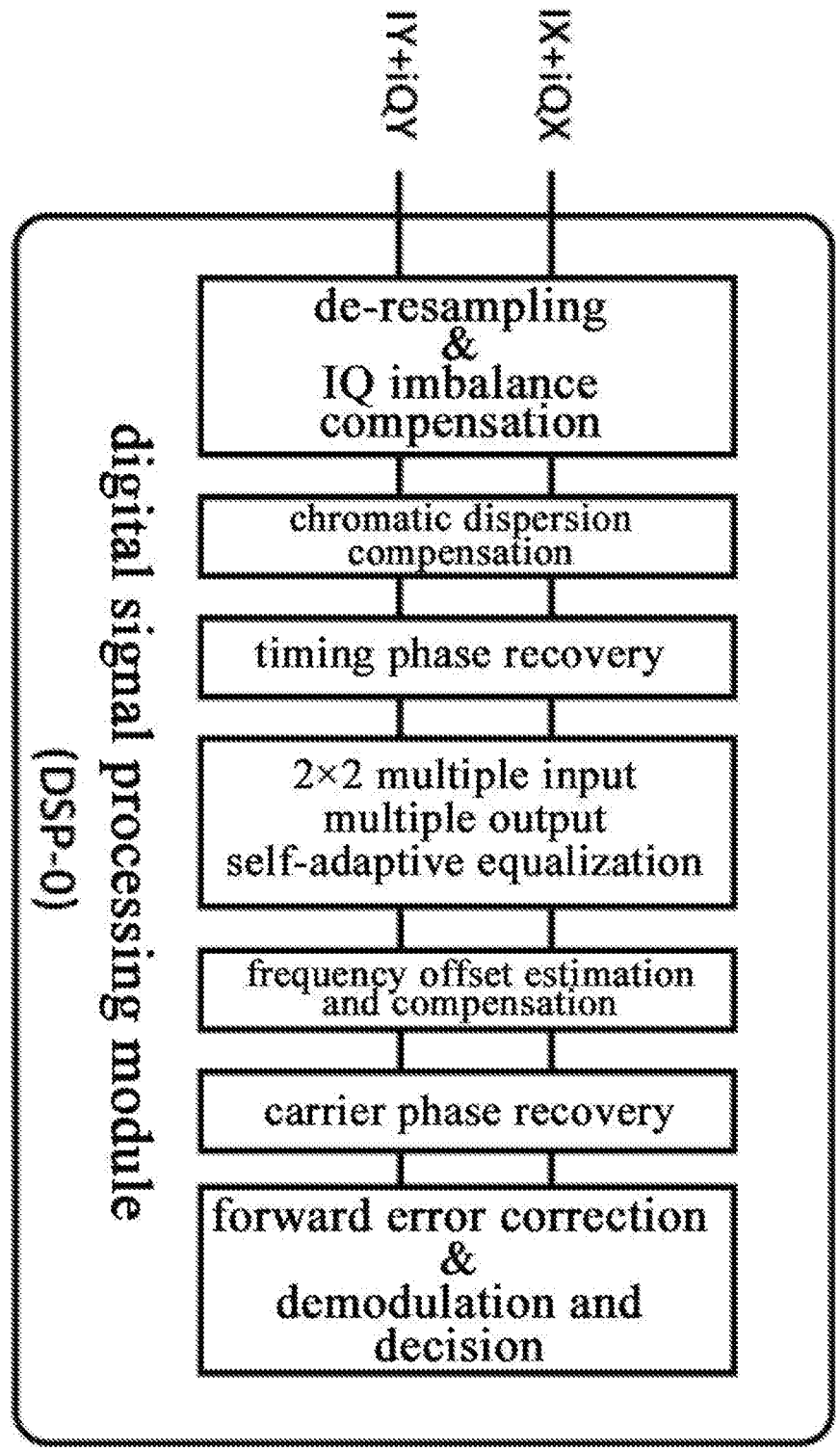
FIG. 2 is a schematic diagram containing a 2×2 multiple-input multiple-output equalization digital signal processing algorithm/a 2×2 digital signal processing module.

In a detailed implementation, as shown in FIG. 2, the digital signal processing algorithm including the 2×2 multiple-input multiple-output equalization comprised steps as follows: de-resampling and in-phase and quadrature (IQ) imbalance compensation, chromatic dispersion compensation, timing phase recovery, 2×2 multiple-input and multiple-output self-adaptive equalization, frequency offset estimation and compensation, carrier phase recovery, forward error correction, and signal demodulation and decision.

Figure 3:
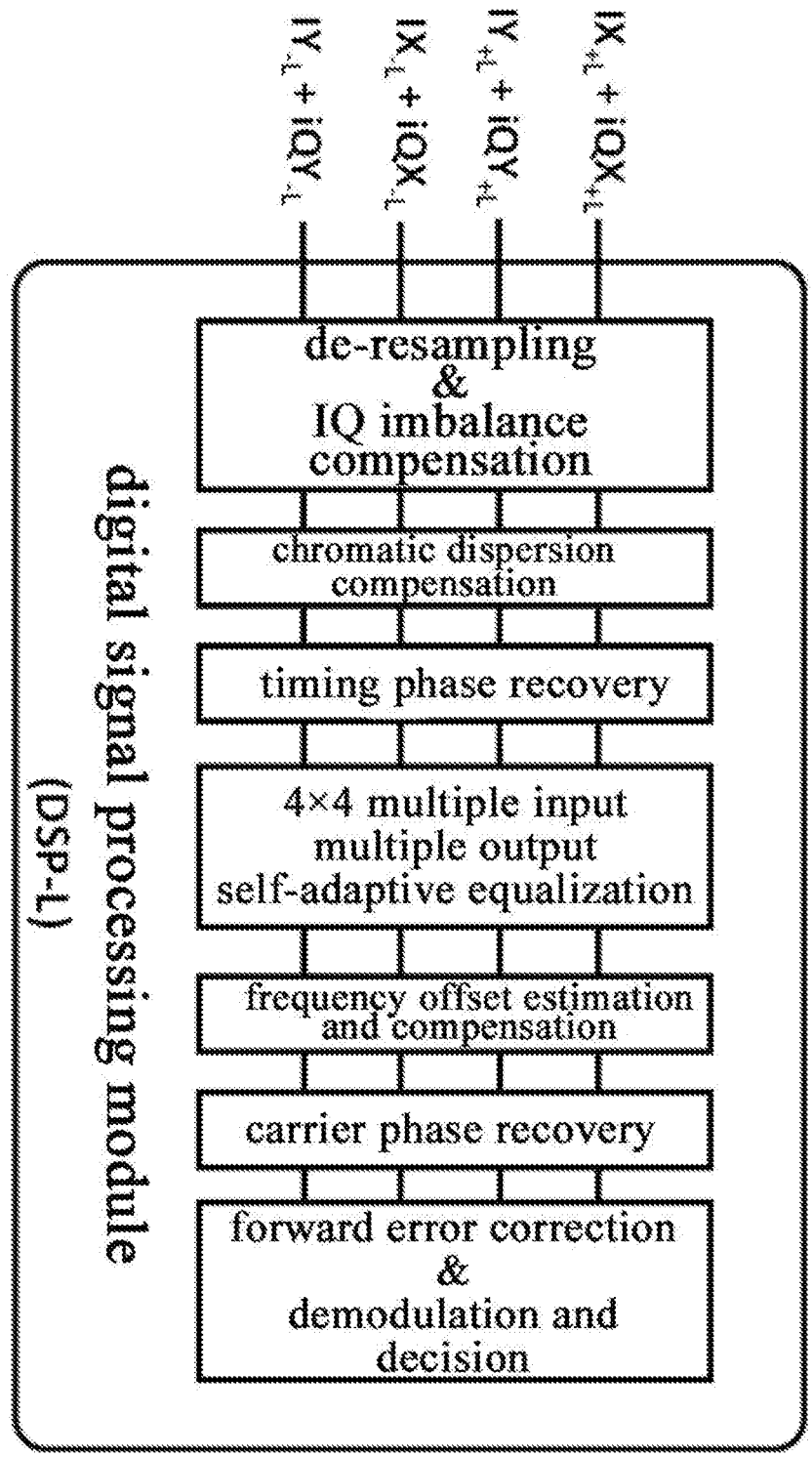
FIG. 3 is a schematic diagram containing a 4×4 multiple-input multiple-output equalization digital signal processing algorithm/a 4×4 digital signal processing module.

In a detailed implementation, as shown in FIG. 3, the digital signal processing algorithm including the 4×4 multiple-input multiple-output equalization comprised steps as follows: de-resampling and IQ imbalance compensation, chromatic dispersion compensation, timing phase recovery, 4×4 multiple-input and multiple-output self-adaptive equalization, frequency offset estimation and compensation, carrier phase recovery, forward error correction, and signal demodulation and decision.

In a detailed implementation, according to differences in a specific network environment and an optical fiber transmission distance, the digital signal processing algorithm including the 2×2 or 4×4 multiple-input multiple-output equalization is any one of a time-domain blind equalization algorithm, a frequency-domain blind equalization algorithm, a mixed time-domain and frequency-domain blind equalization algorithm, and a frequency domain equalization algorithm based on a training sequence. According to a difference in a modulation format of a specific transmission signal, the digital signal processing algorithm including the 2×2 or 4×4 multiple-input multiple-output equalization is any one of a constant modulus algorithm, a cascade multi-mode algorithm, a radius guidance algorithm, or a least mean square algorithm.

Embodiment 2

An orbital angular momentum (OAM) mode-division multiplexing fiber-optic communication is taken as an example. The present embodiment provides a system applying the method in Embodiment 1. As shown in FIG. 1, a specific solution is as follows:

the system includes a mode multiplexer, a graded-index ring-core optical fiber, a mode de-multiplexer, (2n+1) mode converters B, (2n+1) coherent optical receivers, a 2×2 digital signal processing module and a 4×4 digital signal processing module; and n is the number of high-order mode groups or non-zero-order mode groups;

wherein an output end of the mode multiplexer is connected with an input end of the graded-index ring-core optical fiber, an output end of the graded-index ring-core optical fiber is connected with an input end of the mode de-multiplexer, an output end of the mode de-multiplexer is connected with input ends of the (2n+1) mode converters B respectively, output ends of the (2n+1) mode converters B are connected with second input ends of the (2n+1) coherent optical receivers respectively, first input ends of the (2n+1) coherent optical receivers are connected with a local oscillator, output ends of the (2n+1) coherent optical receivers are connected with the 2×2 digital signal processing module or the 4×4 digital signal processing module.

In particular, a working process of the above system is as follows: multiple-input optical signals are converted into optical propagation modes supported by a graded-index ring-core optical fiber and after being multiplexed by a mode multiplexer, the optical signals are injected into the graded-index ring-core optical fiber for transmission; at a receiving end, a mode de-multiplexer is used to separate the received signals into (2n+1) different mode groups. After that, the modes in the (2n+1) different mode groups are transmitted respectively to the (2n+1) mode converters B to be converted into Gaussian mode optical signals capable of supporting a single-mode optical fiber transmission which are then received by the (2n+1) coherent optical receivers, the (2n+1) coherent optical receivers extracted corresponding complex electrical signals. For a 2-way complex optical signal output after a zero-order mode group is received by the coherent optical receiver, a digital signal processing algorithm including a 2×2 multiple-input multiple-output equalization is used for recovery processing; and for a 4-way complex optical signal output after a non-zero-order mode group is received by the coherent optical receiver, a digital signal processing algorithm including a 4×4 multiple-input multiple-output equalization is used for recovery processing.

In a detailed implementation, as shown in FIG. 1, the optical communication system further included (2n+1) mode converters A and (2n+1) polarization division multiplexing optical transmitters, wherein output ends of the (2n+1) polarization division multiplexing optical transmitters are connected to input ends of the (2n+1) mode converters A respectively, and output ends of the (2n+1) mode converters A are connected to an input end of the mode multiplexer.

In particular, the (2n+1) polarization division multiplexing optical transmitters are used to generate the multiple-input optical signal, and the (2n+1) mode converters A are used to convert the multiple-input optical signal into the optical propagation mode supported by the index-graded ring-core optical fiber.

In a detailed implementation, as shown in FIG. 1, the number of the 2×2 digital signal processing modules (DSP-0) is one, and the number of the 4×4 digital signal processing modules (DSP-L) is n; wherein an input end of the 2×2 digital signal processing module is connected with the output end of the coherent optical receiver corresponding to the zero-order mode group; and an input end of one 4×4 digital signal processing module is connected to the output end of coherent optical receiver corresponding to two non-zero-order modes having the same absolute value of order.

In a detailed implementation, as shown in FIG. 2, the 2×2 digital signal processing module (DSP-0) included a resampling and IQ imbalance compensation sub-module, a chromatic dispersion compensation sub-module, a timing phase recovery sub-module, a 2×2 multiple input multiple output self-adaptive equalization sub-module, a frequency offset estimation and compensation sub-module, a carrier phase recovery sub-module, and a forward error correction and demodulation and decision sub-module, which are connected in turn.

In a detailed implementation, as shown in FIG. 3, the 4×4 digital signal processing module (DSP-L) included a resampling and IQ imbalance compensation sub-module, a chromatic dispersion compensation sub-module, a timing phase recovery sub-module, a 4×4 multiple input multiple output self-adaptive equalization sub-module, a frequency offset estimation and compensation sub-module, a carrier phase recovery sub-module, and a forward error correction and demodulation and decision sub-module, which are connected in turn.

Obviously, the above embodiments of the present invention are merely examples for clearly illustrating the present invention, and are not intended to limit the implementations of the present invention. For those of ordinary skill in the art, other different forms of changes or modifications may also be made based on the above description. There is no need or exhaustiveness for all the implementations to be illustrated herein. Any modification, equivalent replacement and improvement made within the spirit and principle of the present invention should be included in the scope of protection of the present invention.

What is claimed is:

1. A construction method of a mode-division multiplexing fiber-optic communication system, the construction method comprises following contents:
  converting multiple-input optical signals into orbital angular momentum (OAM) modes at a transmitting end, after being multiplexed by an OAM mode multiplexer, injecting the optical signals into a graded-index ring-core optical fiber for transmission;
  using an OAM mode de-multiplexer to separate at least two different mode groups at a receiving end, then transmitting the optical signals in each mode group to corresponding OAM mode converters to be converted into Gaussian mode optical signals capable of supporting a single-mode optical fiber transmission which are then detected and received by coherent optical receivers to extract corresponding complex electrical signal, wherein the at least two different mode groups comprises at least two high-order OAM mode groups;
  for a 2-way complex optical signal output after a base mode group or a zero-order mode group is received by the coherent optical receiver, using a digital signal processing algorithm including a 2×2 multiple-input multiple-output equalization for recovery processing; and
  for a 4-way complex optical signal output after a high-order mode group or a non-zero-order mode group is received by the coherent optical receiver, using a digital signal processing algorithm including a 4×4 multiple-input multiple-output equalization for recovery processing,
  wherein there are two modes consisting of zero-order OAM modes ($OAM_0$ modes) with two orthogonal polarizations in the base mode group or zero-order mode group, and
  wherein there are only four modes consisting of $OAM_{+n}$ modes with the two orthogonal polarizations and $OAM_{-n}$ modes with the two orthogonal polarizations in each high-order mode group or non-zero-order mode group, where n is an integer more than zero and represents the mode-group order,
  wherein the fiber-optic communication system further comprising:
  the orbital angular momentum (OAM) mode multiplexer, the graded-index ring-core optical fiber, the OAM mode de-multiplexer, (2n+1) first OAM mode converters, (2n+1) coherent optical receivers, a 2×2 digital signal processing module and a 4×4 digital signal processing module; n is the number of high-order mode groups or non-zero-order mode groups, wherein an output end of the OAM mode multiplexer is connected with an input end of the graded-index ring-core optical fiber, an output end of the graded-index ring-core optical fiber is connected with an input end of the OAM mode de-multiplexer, an output end of the OAM mode de-multiplexer is connected with input ends of the (2n+1) first OAM mode converters respectively, output ends of the (2n+1) first OAM mode converters are connected with second input ends of the (2n+1) coherent optical receivers respectively, first input ends of the (2n+1) coherent optical receivers are connected with a local oscillator, output ends of the (2n+1) coherent optical receivers are connected with the 2×2 digital signal processing module or the 4×4 digital signal processing module, wherein the optical communication system further includes (2n+1) polarization division multiplexing optical transmitters, wherein output ends of the (2n+1) polarization division multiplexing optical transmitters are connected to an input end of the OAM mode multiplexer.

2. The construction method of the mode-division multiplexing fiber-optic communication system according to claim 1, wherein the digital signal processing algorithm including the 2×2 multiple-input multiple-output equalization comprises de-resampling and in-phase and quadrature (IQ) imbalance compensation, chromatic dispersion compensation, timing phase recovery, 2×2 multiple-input and multiple-output self-adaptive equalization, frequency offset estimation and compensation, carrier phase recovery, forward error correction, and signal demodulation and decision.

3. The construction method of the mode-division multiplexing fiber-optic communication system according to claim 1, wherein the digital signal processing algorithm including the 4×4 multiple-input multiple-output equalization comprises de-resampling and in-phase and quadrature (IQ) imbalance compensation, chromatic dispersion compensation, timing phase recovery, 4×4 multiple-input and multiple-output self-adaptive equalization, frequency offset estimation and compensation, carrier phase recovery, forward error correction, and signal demodulation and decision.

4. The construction method of the mode-division multiplexing fiber-optic communication system according to claim 1, wherein according to differences in a specific network environment and an optical fiber transmission distance, the digital signal processing algorithm including the 2×2 or 4×4 multiple-input multiple-output equalization is any one of a time-domain blind equalization algorithm, a frequency-domain blind equalization algorithm, a mixed time-domain and frequency-domain blind equalization algorithm, and a frequency domain equalization algorithm based on a training sequence; and according to a difference in a modulation format of a specific transmission signal, the digital signal processing algorithm including the 2×2 or 4×4 multiple-input multiple-output equalization is any one of a constant modulus algorithm, a cascade multi-mode algorithm, a radius guidance algorithm, or a least mean square algorithm.

5. The fiber-optic communication system according to claim 1, wherein the number of the 2×2 digital signal processing modules is one, the number of the 4×4 digital signal processing modules is n; wherein an input end of the 2×2 digital signal processing module is connected with the output end of the coherent optical receiver corresponding to a base mode group or a zero-order mode group; and an input end of one 4×4 digital signal processing module is connected to the output end of the coherent optical receiver corresponding to one high-order mode group or non-zero-order mode group.

6. The fiber-optic communication system according to claim 1, wherein the 2×2 digital signal processing module includes a resampling and in-phase and quadrature (IQ) imbalance compensation sub-module, a chromatic dispersion compensation sub-module, a timing phase recovery sub-module, a 2×2 multiple input multiple output self-adaptive equalization sub-module, a frequency offset estimation and compensation sub-module, a carrier phase recovery sub-module, and a forward error correction and demodulation and decision sub-module, which are connected in turn.

7. The fiber-optic communication system according to claim 1, wherein the 4×4 digital signal processing module includes a resampling and in-phase and quadrature (IQ) imbalance compensation sub-module, a chromatic dispersion compensation sub-module, a timing phase recovery sub-module, a 4×4 multiple input multiple output self-adaptive equalization sub-module, a frequency offset estimation and compensation sub-module, a carrier phase recovery sub-module, and a forward error correction and demodulation and decision sub-module, which are connected in turn.

8. The construction method of the mode-division multiplexing fiber-optic communication system according to claim 1, wherein the four modes included in each high-order mode group is highly degenerate to keep low differential mode delay in long-distance fiber transmission.

\* \* \* \* \*